United States Patent [19]

Pusch

[11] 4,128,434

[45] Dec. 5, 1978

[54] HIGH DENSITY ASBESTOS-FREE TOBERMORITE THERMAL INSULATION CONTAINING WOLLASTONITE

[75] Inventor: Walter G. Pusch, Westford, Mass.

[73] Assignee: Johns-Manville Corporation, Denver, Colo.

[21] Appl. No.: 809,505

[22] Filed: Jun. 23, 1977

Related U.S. Application Data

[62] Division of Ser. No. 717,807, Sep. 17, 1976, abandoned.

[51] Int. Cl.$^2$ ................................................ C04B 1/00
[52] U.S. Cl. ........................................ 106/120; 106/119
[58] Field of Search .................. 106/120, 119; 423/331

[56] References Cited

U.S. PATENT DOCUMENTS

| | | | |
|---|---|---|---|
| 3,001,882 | 9/1961 | Taylor | 106/120 |
| 3,116,158 | 12/1963 | Taylor | 106/120 |
| 3,501,324 | 3/1970 | Kubo | 106/120 |
| 3,736,163 | 5/1973 | Hoopes et al. | 106/120 |

*Primary Examiner*—Winston A. Douglas
*Assistant Examiner*—J. V. Howard
*Attorney, Agent, or Firm*—Robert M. Krone; Joseph J. Kelly; James W. McClain

[57] ABSTRACT

A high density thermal insulation material is described, consisting essentially of 15 to 40 parts lime, 20 to 40 parts silica or other silicious material, 15 to 40 parts wollastonite, all slurried in water, then compressed to a shape retaining body of at least 20 pcf density and indurated to form an asbestos-free, wollastonite-reinforced, tobermorite calcium silicate hydrate matrix thermal insulation.

10 Claims, No Drawings

HIGH DENSITY ASBESTOS-FREE TOBERMORITE THERMAL INSULATION CONTAINING WOLLASTONITE

CROSS REFERENCE TO RELATED APPLICATION

This application is a divisional of application Ser. No. 717,807 filed Sept. 17, 1976, now abandoned.

BACKGROUND OF THE INVENTION

The invention herein relates to thermal insulations. More particularly it relates to high density thermal insulations composed largely of calcium silicate hydrate.

Calcium silicate hydrate insulations have in the past been divided by industry practice into two groups: low density and high density. The low density or lightweight insulations generally have densities of less than 20 lb/cu. ft. ("pcf"; 0.3 g/cm$^3$). Such materials are used primarily as short length pipe coverings and blocks for tank insulations and the like. They have little physical strength or impact resistance and must be used in settings where they will not be subjected to any physical impacts. In the past such lightweight materials were calcium silicate hydrates reinforced with asbestos fibers; a typical example of such materials is illustrated in U.S. Pat. No. 3,001,882. Subsequently asbestos-free calcium silicate hydrate lightweight insulations were developed, and typical examples are illustrated in U.S. Pat. Nos. 3,501,324 and 3,679,446. In most practical industrial uses the lightweight calcium silicate hydrate insulations have densities on the order of 9 to 15 pcf (0.14 to 0.22 g/cm$^3$); a typical example is an asbestos-free calcium silicate hydrate insulation with a density of about 11 pcf (0.18 g/cm$^3$) sold commercially by the Johns-Manville Corporation under the trademark THERMO-12.

Industry practice has heretofore defined high density calcium silicate hydrate insulations as those having densities of 20 pcf (0.32 g/cm$^3$) or higher; commonly these have densities of 35 to 65 pcf (0.56 to 1.04 g/cm$^3$). These high density materials offer not only good thermal insulation properties but also sufficient strength and durability such that they can be manufactured as large sheets and used for self supporting walls, oven linings, ship bulkheads and the like. Unlike the low density materials, the high density insulations have good nailing, cutting and screw holding characteristics, such that they can be handled in a manner similar to many other construction materials. A high density material of this type which established a very significant place in the market was an asbestos reinforced calcium silicate hydrate board having densities ranging from 23 to 65 pcf (0.37 to 1.04 g/cm$^3$) and which was sold commercially by the Johns-Manville Corporation under the trademark MARINITE. Descriptions of such high density calcium silicate hydrate insulations will be found in U.S. Pat. Nos. 2,326,516 and 2,326,517.

In addition, calcium silicate insulations have been classified on the basis of the crystalline structure of the calcium silicate hydrate which makes up the insulation matrix. References have shown that the crystalline structure of the insulating calcium silicate hydrates can be varied among tobermorite, xonotlite and mixtures thereof, depending on the reaction conditions involved. See, for instance, U.S. Pat. No. 3,501,324; Kalousek et al, *J.Am.Cer.Soc.*, 40, 7, 236–239 (July, 1957); and Flint et al, Research Paper RP-1147, *J.Res.Natl.Bur.Stds.*, 21, 617–638 (November, 1938). U.S. Pat. No. 3,116,158 to W. C. Taylor describes insulations having tobermorite, xonotlite or mixed matrices, and also containing wollastonite as a reinforcing fiber. Taylor stresses, however, that if the matrix is tobermorite wollastonite must be used sparingly and only as a partial substitute for asbestos. In order to prevent slurry settling and resultant poor products, Taylor teaches that the fibrous component in the tobermorite slurry must be at least 40% by weight asbestos and in some cases must be up to 85% by weight asbestos. With a xonotlite matrix, however, all the asbestos may be replaced by wollastonite. Similarly, U.S. Pat. No. 3,001,882 also to Taylor describes the addition of 10% wollastonite to a matrix already containing 20% asbestos. U.S. Pat. No. 3,501,324 describes the addition of wollastonite to a xonotlite matrix as does U.S. Pat. No. 3,317,643. Other patents, such as U.S. Pat. No. 3,238,052 and British Pat. No. 984,112 mention wollastonite in other crystalline phases of calcium silicate materials. Wollastonite as the matrix itself is disclosed in U.S. Pat. No. 3,928,054.

While the high density asbestos reinforced calcium silicate hydrate thermal insulations have proved to be highly effective for many years, recent questions raised regarding the health aspects of asbestos fiber make it desirable to provide an asbestos-free high density calcium silicate hydrate insulation, which insulation will be comparable in thermal and physical properties to the prior art high density asbestos containing insulations.

In addition, it is desirable to have an asbestos-free tobermorite calcium silicate hydrate insulation, for tobermorite is significantly easier to form at moderate levels of temperature and pressure than xonotlite, as the above patents such as U.S. Pat. No. 3,501,324 evidence. Consequently if there could be full substitution of wollastonite for asbestos in the high density tobermorite products and one did not have to obtain yeilds of xonotlite to fully utilize wollastonite, high density calcium silicate hydrate reinforced product production would be significantly enhanced.

SUMMARY OF THE INVENTION

The invention herein is an asbestos-free tobermorite thermal insulation body formed by slurrying a mixture consisting essentially of, in parts by weight: 15 to 40 parts lime, 20 to 40 parts of a siliceous component and 15 to 40 parts wollastonite, said mixture containing no asbestos fiber and having the lime and silica present in a ratio suitable for the formation of tobermorite, in at least one part by weight water per part by weight of said mixture; molding the slurry to a shape-retaining body having a density of at least 20 pcf; and thereafter curing the molded body in an atmosphere of steam at elevated pressure for sufficient time to cause the lime, siliceous component and water to react to form a tobermorite hydrated calcium silicate matrix reinforced by said wollastonite. In various embodiments the mixture also contains up to 8 parts by weight organic fiber; up to 15 parts by weight mineral wool; up to 20 parts by weight perlite; and/or up to 10 parts by weight glass fiber. It is also preferred that the body be molded to a density of at least 35 pcf. In further embodiments the cured body may be laminated to various facings or veneers for appearance or surface treating purposes.

DETAILED DESCRIPTION AND PREFERRED EMBODIMENTS

The principal components of the present insulating composition are lime, silica and wollastonite. The lime may be any suitable hydrated lime or quicklime. The lime will be present as from 15 to 40 parts by weight of the mixture of dry solids and preferably about 25 to 35 parts by weight of the mixture.

The siliceous component of the mixture may be any of a wide variety of substantially pure sources of silica. These may include silica, diatomite and similar materials. The siliceous component will be present as from 20 to 40 parts by weight of the mixture, preferably 30 to 40 parts by weight. (Hereinafter the siliceous component will often be referred to as "silica" for brevity. It will be understood, however, that this is not meant to be limiting.)

Particle size and degree of purity of the lime and siliceous components will be substantially the same as those lime and siliceous components used in the past for asbestos reinforced calcium silicate materials.

The lime and silica will be present in a ratio of 0.50 to 1.1 parts of lime per part by weight of silica. Preferably, however, the lime and silica will be present in a ratio within the range of 0.6 to 1.0 parts by weight of lime per part by weight of silica, more preferably a ratio of 0.8:1. Under the conditions of reaction described below tobermorite is formed essentially exclusively. If the silica is present in excess over the optimum 0.8:1 ratio some silica will remain unreacted and/or insignificant amounts of other calcium silicate hydrate crystalline phases may be formed.

The critical third ingredient of the present thermal insulation composition is wollastonite, which is a crystalline form of anhydrous calcium silicate often referred to by the formula $CaSiO_3$. In the novel tobermorite compositions herein the wollastonite is present as from 15 to 40 parts by weight, preferably 20 to 35 parts by weight of the dry mixture. This is a complete departure from the prior art materials where wollastonite could be used by itself only in a xonotlite matrix and required the presence of large amounts of asbestos for satisfactory inclusion in a tobermorite matrix.

In a preferred embodiment, the insulation body contains, in addition to the lime, silica and wollastonite, up to 8 parts by weight of organic fiber, and preferably 2 to 6 parts by weight of organic fiber. The organic fiber may be kraft fiber, newsprint fiber, polyester, cotton or the like. The purpose of the organic fiber is to provide "green strength" to the molded body prior to its being cured by steam induration and also to provide stress distribution during drying and curing.

In another embodiment the dry mixture may also contain up to 15 parts by weight of mineral wool, and preferably will contain 3 to 10 parts by weight mineral wool. With the presence of the mineral wool it is also possible to reduce the wollastonite content by up to about 20%.

In yet another embodiment the dry mixture also contains up to 20 parts by weight, and preferably 5 to 15 parts by weight, of perlite. The perlite serves as a lightweight aggregate and permits up to about 10% reduction in each of the lime and silica contents.

In yet another embodiment the dry mixture also contains up to about 10 parts by weight of glass fiber. The glass fiber provides a measure of "green strength" and permits reduction in the amount of kraft fiber or other organic fiber which it might be desirable to use. The glass fiber also provides a degree of dry reinforcement of the calcium silicate hydrate matrix at elevated temperatures.

Any of the various additional components, the kraft fiber, mineral wool, perlite and glass fiber, may be present singly or in various combinations.

As noted, the present material contains no asbestos. The insulating body of the present invention is made by forming an aqueous slurry of the lime, silica and wollastonite and any of the other desired dry components. The slurry will contain at least one part by weight of water per part of dry mixture of solids. The particular ratio of water-to-solids will depend on the type of molding process used. Where a "Magnani" molding machine is to be used, the ratio would be about 1:1 or slightly higher. A press mold would usually require a ratio in the range of 2:1 to 6:1 while a Fourdrinier machine would require about 5:1 to 10:1. This slurry is mixed for several minutes to disperse the dry solids thoroughly throughout the slurry. Thereafter the slurry is molded to the desired shape, and enough water is expressed from the slurry to leave a shape-retaining molded body having a density of at least 20 pcf and preferably at least 35 pcf. Normally density will be in the range of 35 to 65 pcf. Typically such a shape is a flat board having a width of from 2 to 4 feet, a length of from 2 to 16 feet and a thickness of from ½ to 2 inches.

The molded board is then placed in an indurating unit, such as an autoclave, where it is cured in the presence of high pressure saturated steam to cause substantially all of the lime and silica to react in the presence of the remaining water to form a tobermorite calcium silicate hydrate matrix throughout the entire board. Steam indurating is dependent on both time and temperature, and normally follows the "rule of thumb" that a 10° C. (18° F.) rise in temperature doubles the reaction rate. Minimum parameters for indurating of the products of this invention would be 8 hours in saturated steam at 100 psig (338° F.; 6.8 atm, gauge 170° C.). Variations can be made in either or both time and temperature according to the above "rule of thumb." Induration periods of 15–20 hours at 100 psig (6.8 atm gauge) saturated steam have proved quite satisfactory. Pressures over 200 psig (13.6 atm gauge) and induration periods over 20 hours are to be avoided, however, for the more severe conditions favor the formation of xonotlite, and such formation defeats the purpose of this invention.

The molded bodies thus cured are high strength, high density tobermorite thermal insulation, which have been found to provide significant thermal insulation for such usages as ship bulkheads, oven walls and the like.

In a typical example, a dry mixture comprising approximately 27 weight percent hydrated lime, 31 weight percent silica, 29 weight percent wollastonite, 4 weight percent kraft fiber, and 9 weight percent mineral wool was slurried in 3 parts water per part of dry mixture. This was then molded in a pressure mold at a pressure of 450 psi (31.5 $kg/cm^2$) to form a board 4 ft. wide by 8 ft. long by 1 inch thick (1.2m × 2.4m × 2.5cm) and having a density of approximately 45 pcf (0.72 $g/cm^3$). The molded board was then autoclaved in the presence of steam for 20 hours at a saturated steam pressure of 100 psig (338° F.; 6.8 atm gauge; 170° C.). Following curing and drying the board was found to have a moisture content of approximately 3%, a modulus of rupture of approximately 800 psi (56 $kg/cm^2$), a length and width shrinkage after 5 hours at 1000° F. (540° C.) of less than 1% in each direction. The crystalline matrix was entirely tobermorite.

What is claimed is:

1. A high density asbestos-free thermal insulation body formed by slurrying a mixture consisting essentially of, in parts by weight: 15 to 40 parts lime, 20 to 40 parts by weight of a siliceous component, and 15 to 40 parts by weight wollastonite, said mixture containing no asbestos fiber, in at least one part by weight water per part by weight of dry solids in said mixture; molding the slurry to a shape-retaining body having a density of at least 20 pcf; and thereafter curing said molded body in an atmosphere of steam at elevated pressure for a sufficient time to cause the lime, siliceous component, and water to form a calcium silicate hydrate matrix consisting essentially of tobermorite crystalline phase and reinforced by said wollastonite.

2. A thermal insulation as in claim 1, wherein said mixture further consists essentially of up to 8 parts by weight of organic fiber.

3. A thermal insulation as in claim 1, wherein said mixture further consists essentially of up to 15 parts by weight of mineral wool.

4. A thermal insulation as in claim 1, wherein said mixture further consists essentially of up to 20 parts by weight of perlite.

5. A thermal insulation as in claim 1, wherein said mixture further consists essentially of up to 10 parts by weight of glass fiber.

6. A thermal insulation as in claim 2 wherein said organic fiber is a kraft fiber, newsprint fiber, polyester, or cotton.

7. A thermal insulation as in claim 3, wherein said mixture further comprises 3 to 10 parts by weight of mineral wool.

8. A thermal insulation as in claim 4, wherein said mixture further comprises 5 to 15 parts by weight of perlite.

9. A thermal insulation as in claim 1 having a density of at least 35 pcf.

10. A thermal insulation as in claim 1 having a density of 35 to 65 pcf.

* * * * *